United States Patent [19]

Brown J. Michael et al.

[11] Patent Number: 4,900,451
[45] Date of Patent: Feb. 13, 1990

[54] METHOD OF CONTROLLING MANGANESE DEPOSITION IN OPEN RECIRCULATING AQUEOUS SYSTEMS

[75] Inventors: Brown J. Michael; Stevn P. Sherwood, both of The Woodlands; E. Paul Holder, Austin, all of Tex.

[73] Assignee: Betz Laboratories, Inc., Trevose, Pa.

[21] Appl. No.: 305,232

[22] Filed: Feb. 1, 1989

[51] Int. Cl.$^4$ .................................. C02F 5/14
[52] U.S. Cl. .................................. 210/699; 210/700; 210/701; 252/180
[58] Field of Search .................. 210/698–701; 252/180, 181, 389.2, 389.24, 389.53, 395; 422/15, 17, 19

[56] References Cited

U.S. PATENT DOCUMENTS

| | | | |
|---|---|---|---|
| 2,847,477 | 8/1958 | Watanabe et al. | 260/611 |
| 4,552,665 | 11/1985 | Ralston et al. | 210/697 |
| 4,560,481 | 12/1985 | Hollander | 210/697 |
| 4,640,818 | 2/1987 | Grierson et al. | 422/15 |
| 4,659,481 | 4/1987 | Chen | 210/697 |
| 4,659,482 | 4/1987 | Chen | 210/699 |
| 4,671,880 | 6/1987 | Wisener et al. | 210/699 |
| 4,784,774 | 11/1988 | Amjad et al. | 210/701 |

OTHER PUBLICATIONS

Morris et al., "Manganese Deposits in Utility Condensers-Experience Report, Electric Power Research Institute Symposium Paper, Lake Buena"Vista, Fla. Jun. 18-20, 1985.

*Primary Examiner*—Peter Hruskoci
*Attorney, Agent, or Firm*—Alexander D. Ricci; Steven D. Boyd

[57] ABSTRACT

A method of inhibiting manganese deposition in open, recirculating aqueous systems is disclosed. A water soluble acrylic acid/allyl hydroxy propyl sulfonate ether copolymer having repeat units characterized by the structural formula:

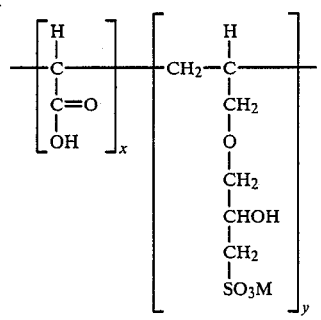

wherein M is a water soluble cation, the molar ratio x:y is from about 3:1 to about 6:1 and the number average molecular weight of the copolymer is from about 5,000 to about 10,000, preferably with an organic phosphonate is added to the aqueous system. The organic phosphonate is preferably hydroxy ethylidene diphosphonic acid, diethylene triamine penta-(methylene phosphonic acid) or blends thereof. The copolymer or copolymer and phosphonic acid is effective in inhibiting the deposition of manganese in aqueous systems.

3 Claims, 7 Drawing Sheets

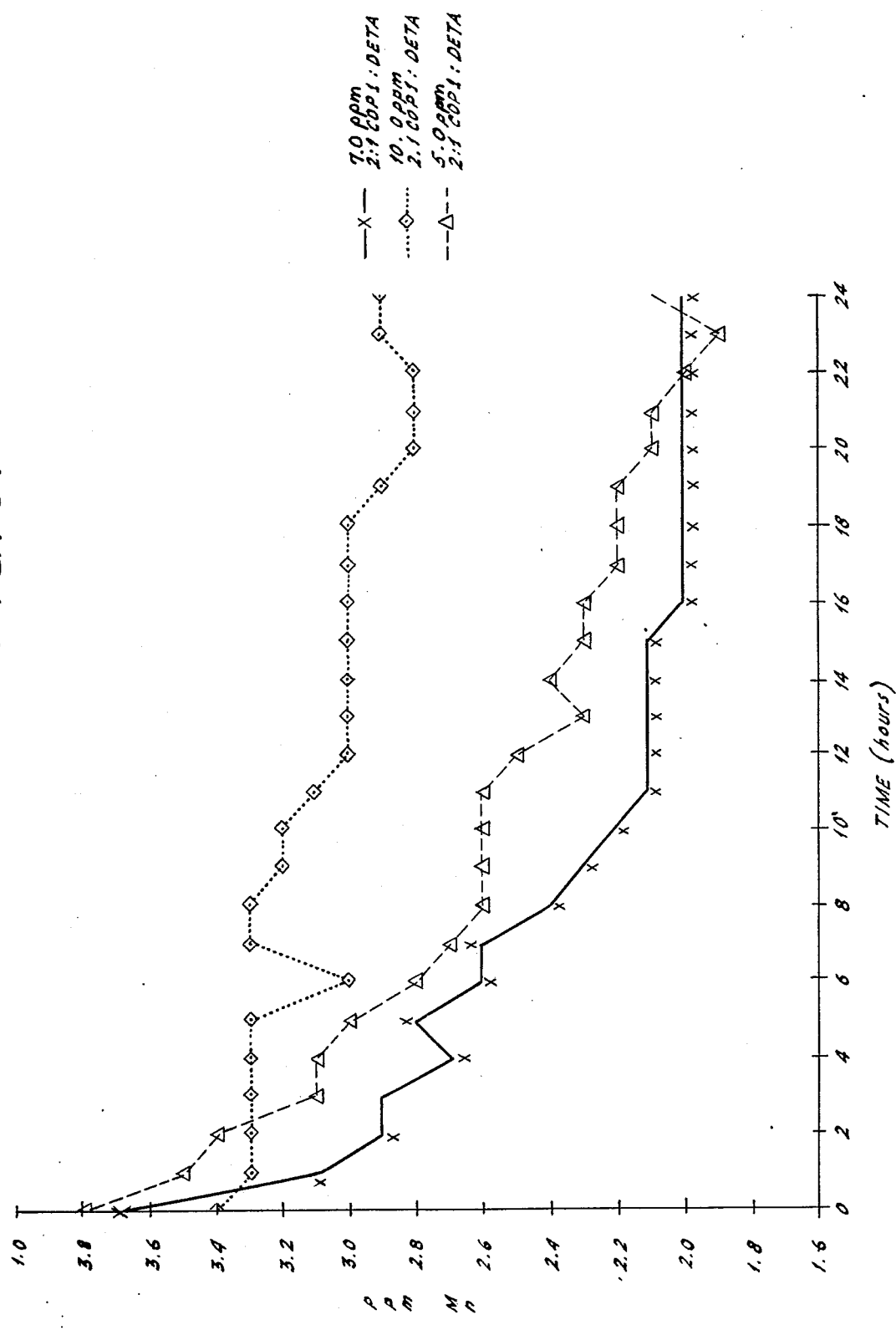

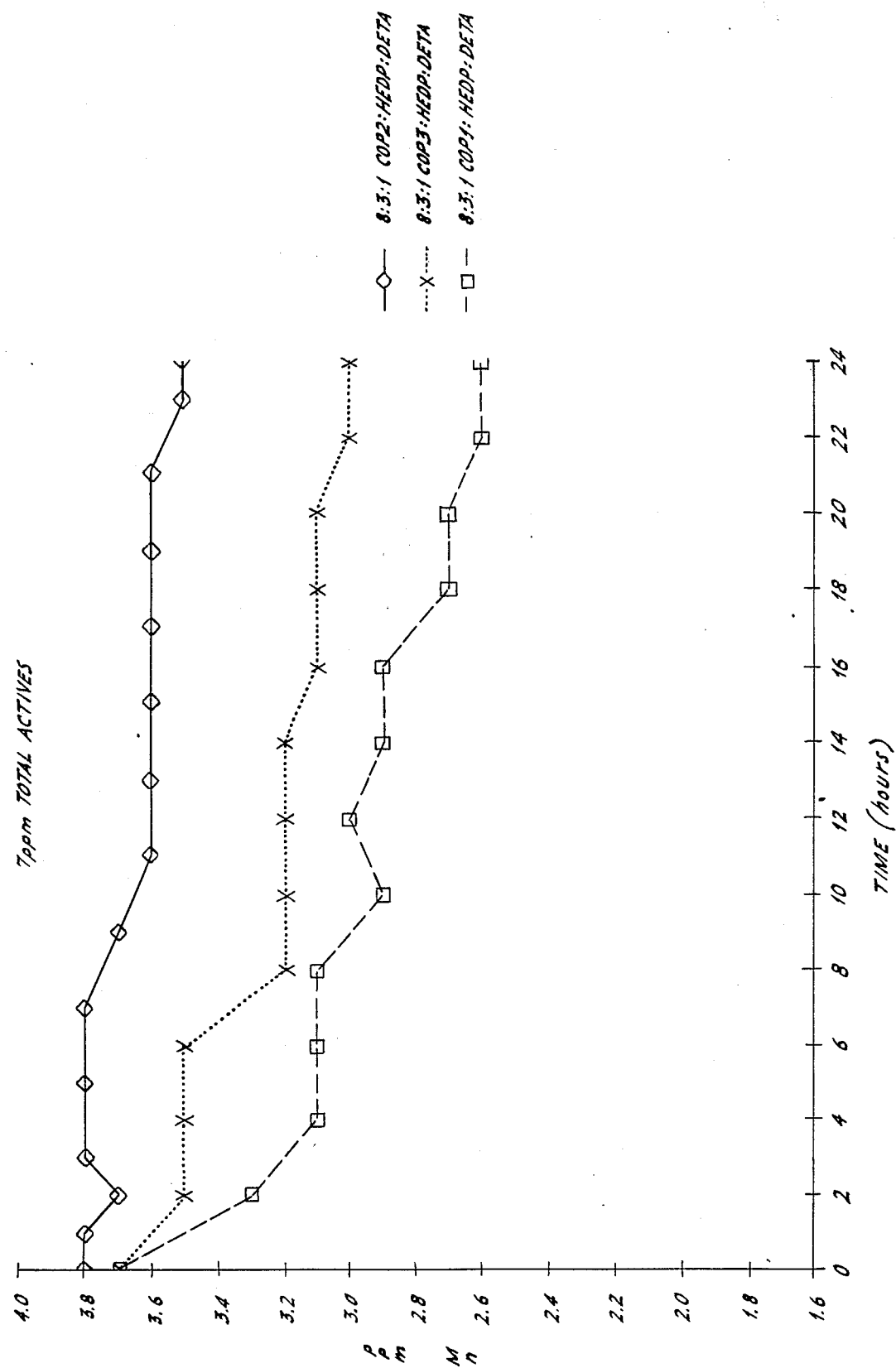

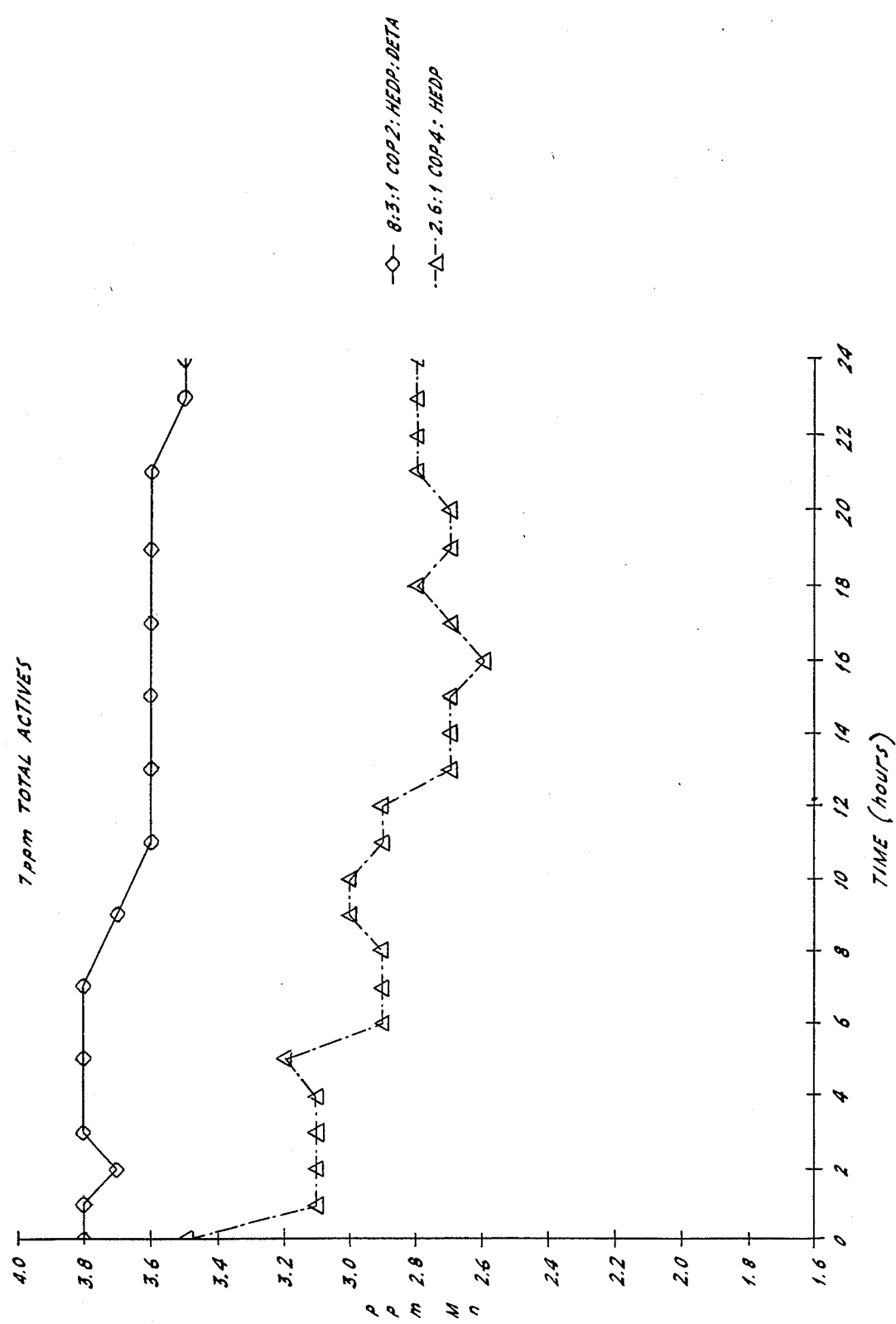

METHOD OF CONTROLLING MANGANESE DEPOSITION IN OPEN RECIRCULATING AQUEOUS SYSTEMS

FIELD OF THE INVENTION

The present invention is directed toward the inhibition of the formation and deposition of manganese in open recirculating water systems; such as, cooling, boiler, and gas scrubbing systems.

BACKGROUND OF THE INVENTION

The problems of foreign material deposition and corrosion and attendant affects have troubled water systems for many years. For instance, deposits tend to form on internal walls of various water systems; such as, boiler and cooling water systems, and thereby materially lessen the operational efficiency of the system.

Deposits may originate from several sources. For example, calcium carbonate, calcium sulfate, and calcium phosphate from a systems feedwater can accumulate along or around a systems metal surfaces forming scale. Also, manganese which can be found in natural waters at concentrations up to several parts per million can result in the formation of manganese deposits. Manganese oxides and hydroxides are soluble in water to 1 part per million or less and suspended solids of these compounds are commonly found. In cooling systems where the trend is towards higher cycles of concentration, the level of manganese oxides and hydroxides can increase to the point where deposition becomes a problem. Manganese occurs at significant concentrations in many well and surface waters throughout the United States and is also generally present in estuarian and coastal waters. Manganese is sometimes referred to as "Ohio River Varnish" due to its ubiquitous presence along that river and the hard, dark brown to black nature of its deposits.

An important factor effecting manganese deposition in cooling systems is oxidation to insoluble manganese dioxides by chlorination. This oxidation process is enhanced by the elevated pH which generally occurs through cycling in cooling towers.

While manganese deposition has been noted on all metallurgies, plastics and heat transfer and non-heat transfer surfaces, metallurgy can play a factor in manganese deposition. Specific stainless steel alloys, admiralty and aluminum brass have all been found to be particularly susceptible to manganese deposition and the attendant pitting of the metal.

Any waters having detectable manganese concentrations (above 0.02 ppm) may experience manganese deposition problems. At levels higher than 0.2 ppm, deposition is very likely. Manganese levels greater than 1 ppm generally cause severe problems and manganese levels rarely exceed 2 ppm even in cycled water.

Manganese deposition on tubes has been identified as manganese dioxide. Typically, it appears initially as a thin, tightly adhered, brown-black varnish which becomes thicker, rougher and more irregular if permitted to accumulate. The uniform, tightly adherent nature of the deposits lends itself well to setting up oxygen or metal ion concentration cells at holidays in the deposit probably responsible for the severe pitting effects of such deposits.

In once-through cooling systems in Japan, injection of ferrous sulfate has been credited with greatly reducing malignant impingement attack of aluminum brass caused by manganese deposition. In the United States, on-line mechanical cleaning devices as well as off-line cleaning are employed. Off-line cleaning procedures can include chemical acid cleaning, hydroblasting and metal scrapper plugs.

The present invention provides dispersants which are added to an open water system to control manganese deposition. The dispersants of the present invention also preferably include an inhibitor to inhibit precipitation of manganese oxides. The use of the water soluble copolymer of the present invention to control calcium scale, as well as provide a passive oxide film on metal surfaces is disclosed in commonly assigned U.S. Pat. Nos. 4,659,481 and 4,659,482.

DETAILED DESCRIPTION OF THE INVENTION

In accordance with the present invention, it has been surprisingly discovered that water soluble copolymers, as shown in Formula 1 hereinafter, in combination with certain organic phosphonates, are effective in controlling the formation of manganese deposits and thereby inhibiting corrosion attendant thereto.

The water soluble copolymers of the present invention have the structure:

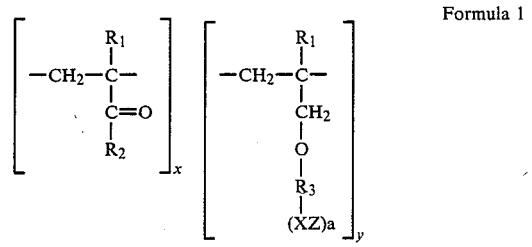

Formula 1 wherein $R_1$ is H or lower alkyl ($C_1$–$C_3$); $R_2$ is OH or OM, or $NH_2$; M is a water soluble cation., $R_3$ is a hydroxy substituted alkyl or alkaline radical having from 1 to 6 carbon atoms or a nonsubstituted alkyl or alkylene radical having from 1 to 6 carbon atoms; X, when present, is an anionic radical selected from the group consisting of $SO_3$, $PO_3$, $PO_4$, and COO, Z, when present, is H or hydrogens or any water soluble cation or cations which together counterbalance the valence of the anionic radicals, a is 0 or 1.

The number average molecular weight of the water soluble copolymers of Formula 1 may fall within the range of 1,000–1,000,000. Preferably the number average molecular weight will be within the range from 1,500 to 500,000 with the range of about 1500 to about 10,000 being even more highly desirable. The key criterion is that the polymer be water soluble.

The molar ratio x:y of the monomers of Formula 1 may fall within the range of between about 30:1 to 1:20, with the x:y molar ratio range of from about 10:1 to 1:5 being preferred.

At present, the water soluble polymer preferred for use in the cooling systems is:

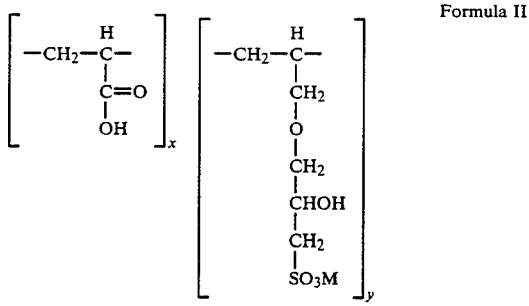

Formula II wherein M is the same as given in Formula 1. This polymer (Formula II) is referred to as an acrylic acid-/allyl hydroxy propyl sulfonate ether (AA/AHPSE). The IUPAC nomenclature for AHPSE is 1-propane sulfonic acid, 2-hydroxy-3-(2-propenyl oxy)-mono sodium salt. Heretofore, the AHPSE monomer has been used in the emulsion polymerization of acrylate esters, vinyl acetate and styrene for the manufacturer of latex paints.

With respect to both repeat units of the polymers of the present invention, they may exist in acid or water soluble salt form when used in the desired water system.

As to the preparation of the monomer designated as x above, in Formula 1, it may be produced by hydrolysis of acrylonitrile or via oxidation of acrolein. Other well-known vinyl containing monomers such as, methacrylic acid and acrylamide may be utilized as monomer x of Formula 1 in accordance with the present invention.

Turning to the allyl containing monomer, monomer y, in Formula 1 above, these may be produced by reacting alyl alcohol with a nontertiary alcohol in a temperature range of about 25° to 150° C. as is detailed in U.S. Pat. No. 2,847,477 (the entire disclosure which is hereby incorporated by reference). Followed by, if desired, sulfonation, phosphorylation, phosphonation or carboxylation of the monomer via well-known techniques.

The preferred allyl hydroxy propylsulfonate ether monomers (Monomer y of Formula II) may conveniently be prepared via a ring opening reaction of the epoxy group of an allyl glycidyl ether precursor. Sulfonation of the epoxy group with sodium sulfite in the presence of a phase transfer catalyst; such as, tetra-N-butyl ammonium bisulfite or with fuming sulfuric acid containing sulfur trioixide will produce the sulfonic acid group and hydroxy group of the AHPSE. The resulting monomer can be further neutralized with a caustic or other base material as is detailed in U.S. Pat. No. 4,659,481 (the entire disclosure of which is hereby incorporated by reference).

After the desired monomers have been obtained, free radical chain addition polymerization may proceed in accordance with conventional solution polymerization techniques. Polymerization initiators; such as, persulfate initiators, peroxide initiators, etc. may be used. Preferrably the requisite monomers are mixed with water and alcohol (preferably isopropanol). The resulting polymer may be isolated by well-known methods; such as, distillation, etc. or the polymer may simply be used in aqueous solution.

The polymers should be added to the aqueous system for which deposition control is desired in an amount effective for the purpose. This amount will vary depending upon the particular system for which treatment is desired and will be influenced by factors, such as, the area subject to deposition, pH, temperature, concentration of manganese in the water etc. For the most part, the polymers will be effective when used at levels of about 1.0 to about 100 parts per million parts of water, and preferably from about 5.0 to about 20 parts per million parts of water contained in the aqeuous system to be treated. The polymers may be added directly into the desired water system in a fixed quantity and in a state of an aqueous solution, continuously or intermittently.

The water soluble polymers of the present invention are preferably used in combination with an organic phosphonate to enhance the deposition inhibition properties of thereof. Examples of acceptable organic phosphonates include hydroxyethylidenediphosphonic acid (HEDP), diethylenetriamine penta-(methylene phosphonic acid) (DETA), aminotri(methyphosphonic acid) (AMP), hexamethylenediaminetetra(methyphosphonic acid) (HMDTMP), ethylenediaminetetra(methylenephosphonic acid) (EDTMP), 2-phosphonobutane-1,2,4-tricarboxylic acid (PBTC), hydroxypropyldiphosphonic acid (HPDP) or blends thereof. Such organic phosphonates may be added to the system in an amount of from about 0.1 to about 100 parts per million.

The polymers of the present invention may be used in combination with yet other agents including corrosion inhibitors, conventional scale and contamination inhibitors, metal ion sequestering agents, and other conventional water treatment agents. Methods for preparing the acrylic acid/allyl hydroxylpropyl sulfonate ether copolymers are set forth in U.S. Pat. Nos. 4,659,481 and 4,659,482 (the entire disclosures of which are incorporated herein by reference).

The following examples demonstrate that the copolymers of the present invention are effective in inhibiting the formation of manganese deposits normally encountered in industrial water systems; such as, cooling systems.

The preferred rate of application of the present invention to cooling water systems and the ratio of components depends upon the manganese of the system water. The treatment is preferably applied in waters having between 0.1 and 25 ppm manganese. Within this range, the weight ratio of the manganese to phosphonate is varied from about 10 to 1 to about 1 to 10, the weight ratio of polymer to phosphonate is varied from about 5 to 1 to about 1 to 5.

The above dosages represent the most desirable ranges since most systems will be treatable therewith. Higher dosages are permissible when the situation demands, but of course are more costly. The effectiveness of the inventive treatments are dependent upon the aqueous system having a pH of 5.5 and above and preferably 6.5 to 9.5.

Deposit Control Activity

One method of evaluating deposit control activity of the material consists of measuring its ability to prevent bulk phase precipitation of a salt at conditions for which the salt would normally precipitate. It is additionally important to recognize that the material being evaluated is tested at "substoichiometric" concentrations. That is, typical molar ratios of precipitating cations to the material being evaluated are on the order of 20:1 and much greater. Consequently, stoichiometric sequestration is not the route through which bulk phase precipitation is prevented. This well-known phenomenon is also called "threshold" treatment and is widely practiced in water treatment technology to prevent scale deposits from forming on various surfaces.

Two types of testing are presented herein, static testing often referred to as beaker testing and dynamic testing often referred to as recirculator testing. Static testing is useful for screening selected deposit control agents, however more meaningful results are believed to be obtained from dynamic testing which more closely resembles application conditions. Static testing only evaluates the inhibition of the precipitation of insoluble salts while dynamic testing can evaluate the fouling tendency on heat transfer surfaces in addition to precipitation of insoluble salts. The static test is performed by adding 8 ppm of Mn+2 and the inhibitor to be tested to a solution buffered at pH 8.5 and allowing the solution to equilibrate at 50° C. for 17 hours. In addition to the previously mention constituents, 0.2 g of 100 mesh 304-1 stainless steel powder is also added to the solution. Stainless steel, and other metallurgies, have been known to promote oxidation of manganese in cooling water systems. After the equilibration period, the solution is filtered through a 0.2 micron filter and the filtrate analyzed for manganese. The inhibition efficacy of the treatment is related to the amount of manganese that remains after filtration expressed as a percentage of the original 8 ppm of manganese.

The two types of mechanisms believed to be involved in controlling deposition are inhibition of precipitation/oxidation and dispersion of solid precipitated particles. It is believed that organic phosphonates behave as inhibitors of manganese precipitation as evidenced by the decreased color change noted in beaker testing. Reduced manganese(II) ion is colorless and gradually produces a brownish precipitate, manganese(IV) dioxide as the test proceeds. Polymeric dispersants do not inhibit the formation of the manganese dioxide but function to affect particle nucleation and particle growth to produce finely divided precipitates which will pass through a 0.2 micron filter and thus give apparent high values of inhibition in static testing. Oxidation of the manganese is evidenced by the change in color of the solution from colorless to light brown. Although oxidation of the manganese is occurring, as evidenced by the color change, the static test will report a high level of inhibition if the particles are small enough to pass through a 0.2 micron filter. Experience has shown that testing under dynamic conditions can provide much more meaningful data then static screening and can sometimes give results that conflict wit static results. In cases where static and dynamic testing give conflicting results more credence is given to dynamic testing.

In the results that follow, manganese oxides and hydroxides commonly found in industrial water systems under various conditions have been selected as precipitants. The results are expressed as "percent inhibition", positive values indicate that the stated percentage of precipitate was prevented from being formed. Except where noted to be to the contrary, the following conditions, solutions, and testing procedures were utilized to perform the inhibition tests, the results of which are reported herein Tables 1 to 6. In the tables, the following abbreviations have been used: AA for acrylic acid; AHPSE for 1-propane sulfonic acid 2-hydroxy-3-(2-propenyl oxy)-mono sodium salt; DETA for diethylenetriamine; HEDP for hydroxyethylidine-diphosphonic acid; HPA for hydroxypropylamine.

Static Manganese Oxidation Inhibition Procedure

Conditions pH=8.5, Temperature=50° C., 400 ppm Ca as $CaCO_3$, 475 ppm Mg as $CaCO_3$, 3.7 ppm NN(II) 0.8 ppm Fe(III), 0.2 grams 100 mesh 304-L stainless steel.

1. Dispense 10 ml of a 10 milimole borate buffer solution adjusted to pH 8.5, 90 ml of water, 200 microliters of a 1.0M solution of $CaCl_2$ solution, and 0.2 g of 100 mesh 304-L stainless steel into an 8 oz. glass bottle.
2. Place bottles into an incubator at 50° C. for 17 hours.
3. Remove bottles and add treatment solution at desired level of concentration followed by 1613 microliters of 0.01M solution of manganese(II) nitrate.
4. Reserve one bottle for a control which has manganese solution but no treatment.
5. Place bottles in incubator at 50° C.
6. Remove bottles at desired time interval and allow to cool.
7. Filter 25 ml of solution from bottle through a 0.2 micron filter.
8. Analyze filtrate for manganese concentration.
9. Manganese inhibition at each time interval is determined by the following formula:

$$\% \text{ Inhibition} = \frac{(\text{Mn in treated solution} - \text{ppm Mn in untreated})}{8 \text{ ppm}} \times 100\%$$

TABLE 1

Static Manganese Oxidation Inhibition Test Results

| Treatment Concentration (ppm active) | DETA | HEDP |
|---|---|---|
| % Inhibition @ 24 hours | | |
| 2 | 58 | 50 |
| 5 | 72 | 67 |
| 10 | 81 | 67 |
| % Inhibition @ 48 hours | | |
| 2 | 33 | 17 |
| 5 | 61 | 47 |
| 10 | 75 | 50 |

TABLE 2

Static Manganese Oxidation Inhibition Test Results
COP1:DETA Blends

| Treatment Concentration (ppm active) | COP1:DETA 1:1 | COP1:DETA 3:1 | COP1:DETA 5:1 |
|---|---|---|---|
| % Inhibition @ 24 hours | | | |
| 2 | 39 | 19 | 14 |
| 5 | 61 | 61 | 58 |
| 10 | 72 | 69 | 64 |
| % Inhibition @ 48 hours | | | |
| 2 | 11 | 6 | 3 |
| 5 | 61 | 33 | 31 |
| 10 | 64 | 56 | 39 |

COP1 = copolymer of AA and AHPSE, 6:1 mole ratio

TABLE 3

Static Manganese Oxidation Inhibition Test Results
COP1:HEDP Blends

| Treatment Concentration (ppm active) | COP1:HEDP 1:1 | COP1:HEDP 3:1 | COP1:HEDP 5:1 |
|---|---|---|---|
| % Inhibition @ 24 hours | | | |

TABLE 3-continued

Static Manganese Oxidation Inhibition Test Results
COP1:HEDP Blends

| Treatment Concentration (ppm active) | COP1:HEDP 1:1 | COP1:HEDP 3:1 | COP1:HEDP 5:1 |
|---|---|---|---|
| 2 | 56 | 39 | 8 |
| 5 | 75 | 61 | 58 |
| 10 | 78 | 72 | 67 |
| % Inhibition @ 48 hours | | | |
| 2 | 25 | 8 | 0 |
| 5 | 58 | 50 | 31 |
| 10 | 67 | 61 | 61 |

COP1 = copolymer of AA and AHPSE, 6:1 mole ratio

Table 1 gives the results of static manganese oxidation inhibition testing for DETA and HEDP 2, 5 and 10 ppm active concentration after 24 hours and 48 hours. These results indicate that DETA is more efficacious for inhibiting manganese than HEDP. This trend was reversed in dynamic testing.

Table 2 shows the results of blending a polymeric dispersant, COP1, with DETA for static manganese oxidation inhibition. Table 3 gives the results of the same testing for blends of COP1 with HEDP. These results indicate that blending polymers with organic phosphonate lowers the efficacy of the phosphonate and that the blends with higher phosphonate content exhibit the most efficacy for inhibiting manganese oxidation.

Static testing indicates that organic phosphonates are the most efficacious manganese inhibitors and that the addition of a polymeric dispersant reduces the efficacy of the phosphonate through dilution. Dynamic testing, however, indicates that a combination of certain polymeric dispersants with certain organic phosphonates provides an enhanced treatment program by combining the effects of inhibition and dispersion to control deposition of insoluble manganese species on heat transfer surfaces. The results of the dynamic testing showing increased efficacy with a blend of copolymer and organic phosphonate was surprising in view of previous static test results.

Dynamic Recirculator Testing

Dynamic testing of the polymer:organic phosphonate blends of the present invention was conducted in bench top recirculators using a synthetic water matrix composed of 400 ppm Ca as $CaCO_3$, 175 ppm Mg as $CaCO_3$, 240 ppm $NaHCO_3$, 8 ppm Fe(II) and 3.6 ppm Mn(II). A deoxygenated solution of ferrous ammonium sulfate. Iron was shot fed to the sump at the beginning of the run to give an initial iron concentration of 8 ppm. Subsequent makeup iron feed was added with a syringe pump. Manganese was added as manganese (II) nitrate. The treatment was added to the water matrix. In the bench top recirculator a pump recirculates the solution from the sump across a heated stainless steel tube and then back in the sump. The sump temperature was maintained at 108° F. by a cooling loop immersed into the sump. The total recirculator system volume was approximately 11 liters and was operated at a blowdown rate of one system volume per day. A makeup solution was added at a rate of one system volume per day to maintain a constant volume. A stainless steel heat transfer tube was electrically heated to maintain a heat output of 14,000 BTU/ft*ft*hr. The recirculating rate was 4.0 gallons per minute. Aliquots from the sump were taken at approximately one hour intervals and analyzed for soluble manganese(II). The soluble manganese level in the sump was plotted versus time to evaluate the inhibition efficacy of the treatment solution. The efficacy of the treatment is directly proportional to the soluble manganese sump concentration during the test. An efficacious treatment will maintain soluble manganese levels at a value near the original manganese concentration of 3.6 ppm. The efficacy of treatments are also evaluated by the appearance of the heat transfer surface. Heavy deposition and fouling of iron and manganese on the heat transfer tube indicates that the treatment is not efficacious. A good correlation exists between soluble manganese levels in the sump and the appearance of the heat transfer surface for all of the treatments tested.

The following designations are used for the copolymers:

COP1—copolymer of AA and AHPSE, 6:1 mole ratio
COP2—copolymer of AA and AHPSE, 3:1 mole ratio, low molecular weight
COP3—copolymer of AA and AHPSE, 3:1 mole ratio, high molecular weight
COP4—copolymer of AA and HPA, 3:1 mole ratio

BRIEF DESCRIPTION OF THE DRAWINGS

FIG. 5 shows the dose-response effect of blends of 2:1 COP1:DETA. 10 ppm total actives is more efficacious than 5 ppm which appears to be more efficacious than 7 ppm total actives. The reason for 5 ppm being more efficacious than 7 ppm is not known. This result may be the result of a system error.

FIG. 6 shows the differences in 8:3:1 blends of polymer:HEDP:DETA or different polymers. COP2 is more efficacious than COP3 which is more efficacious than COP1. This difference in efficacy is surprising since the polymers are similar. This shows that the preferred polymer is COP2.

FIG. 7 compares the data obtained from a 8:3:1 blend of COP2:HEDP:DETA (2:1 polymer: total phosphonate) with that obtained for a blend of 2.6:1 COP4:HEDP. The COP2 polymer is significantly more efficacious than COP4.

Figure 1:
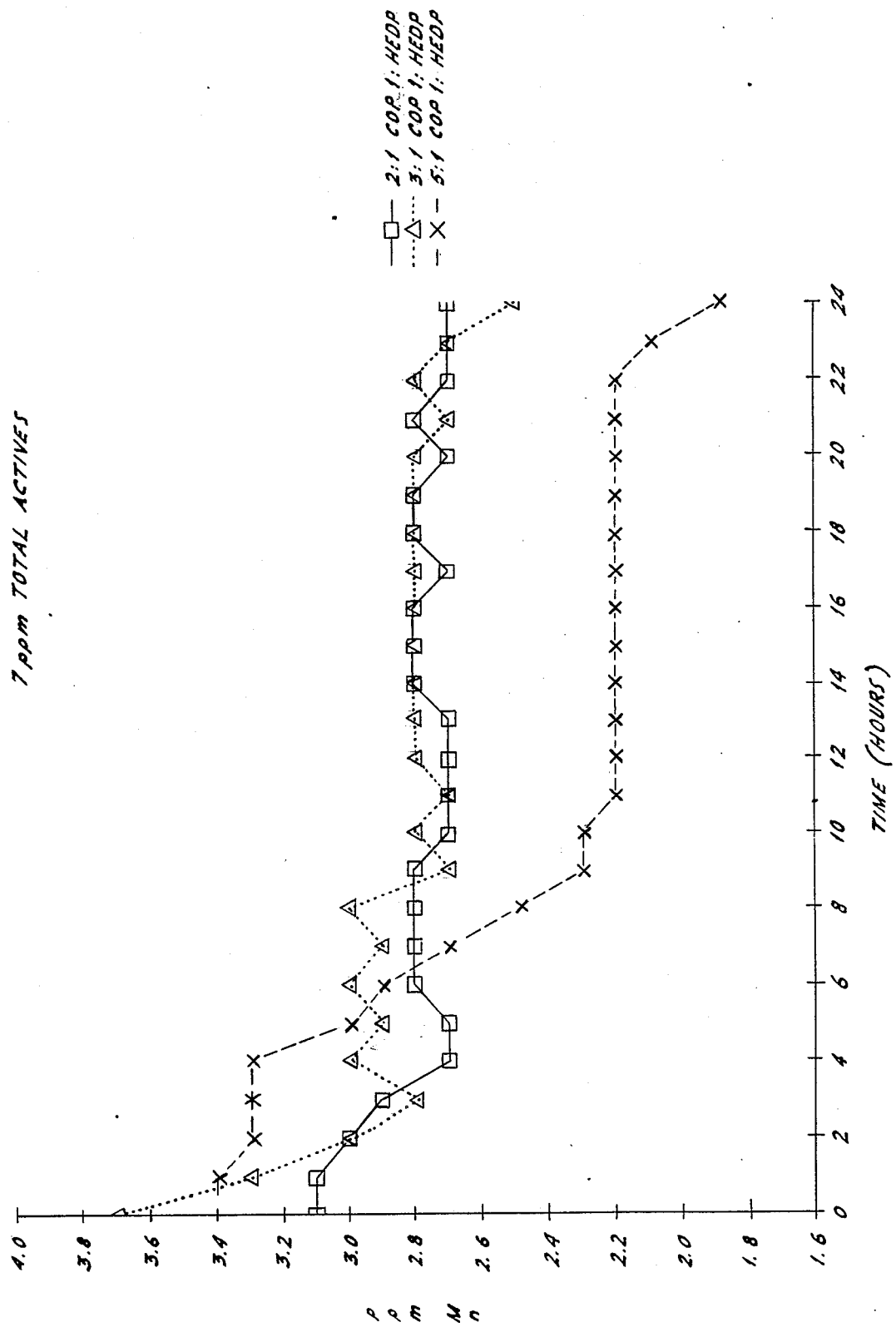
FIG. 1 gives results for 2:1, 3:1 and 5:1 blends of COP1:HEDP. The results indicate that the 2:1 and 3:1 blends are approximately equal in efficacy and are significantly better than the 5:1 blend. This indicates that the efficacy of the blends increases with increasing organic phosphonate content up to 3:1, afterwhich no increasing efficacy is gained by the higher phosphonate ratio.
Figure 2:
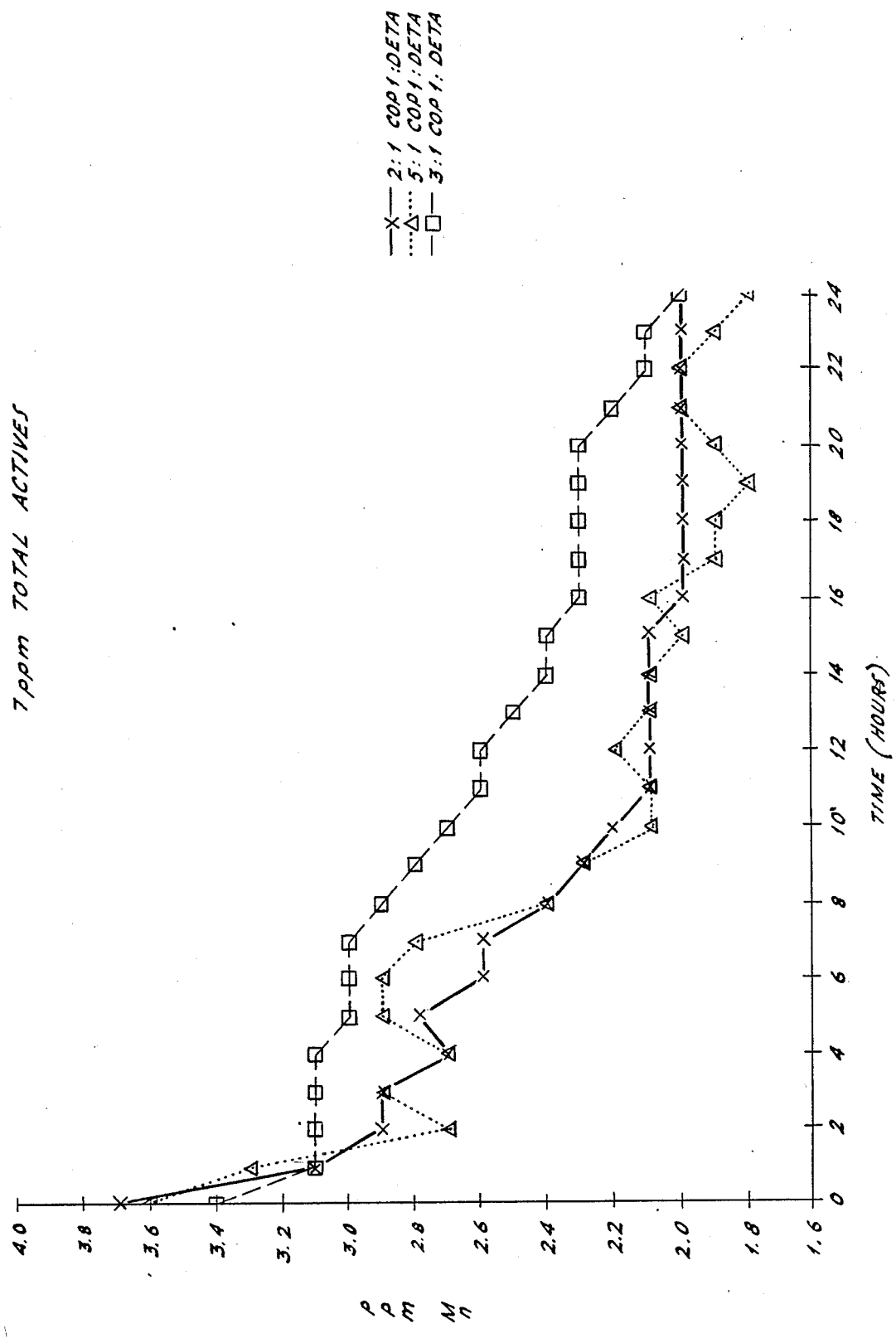
FIG. 2 shows the same results for blends with COP1:DETA. The 3:1 blend is significantly better than the 2:1 and 5:1 blends. The blends of this phosphonate exhibit a maximum efficacy at the 3:1 ratio.
Figure 3:
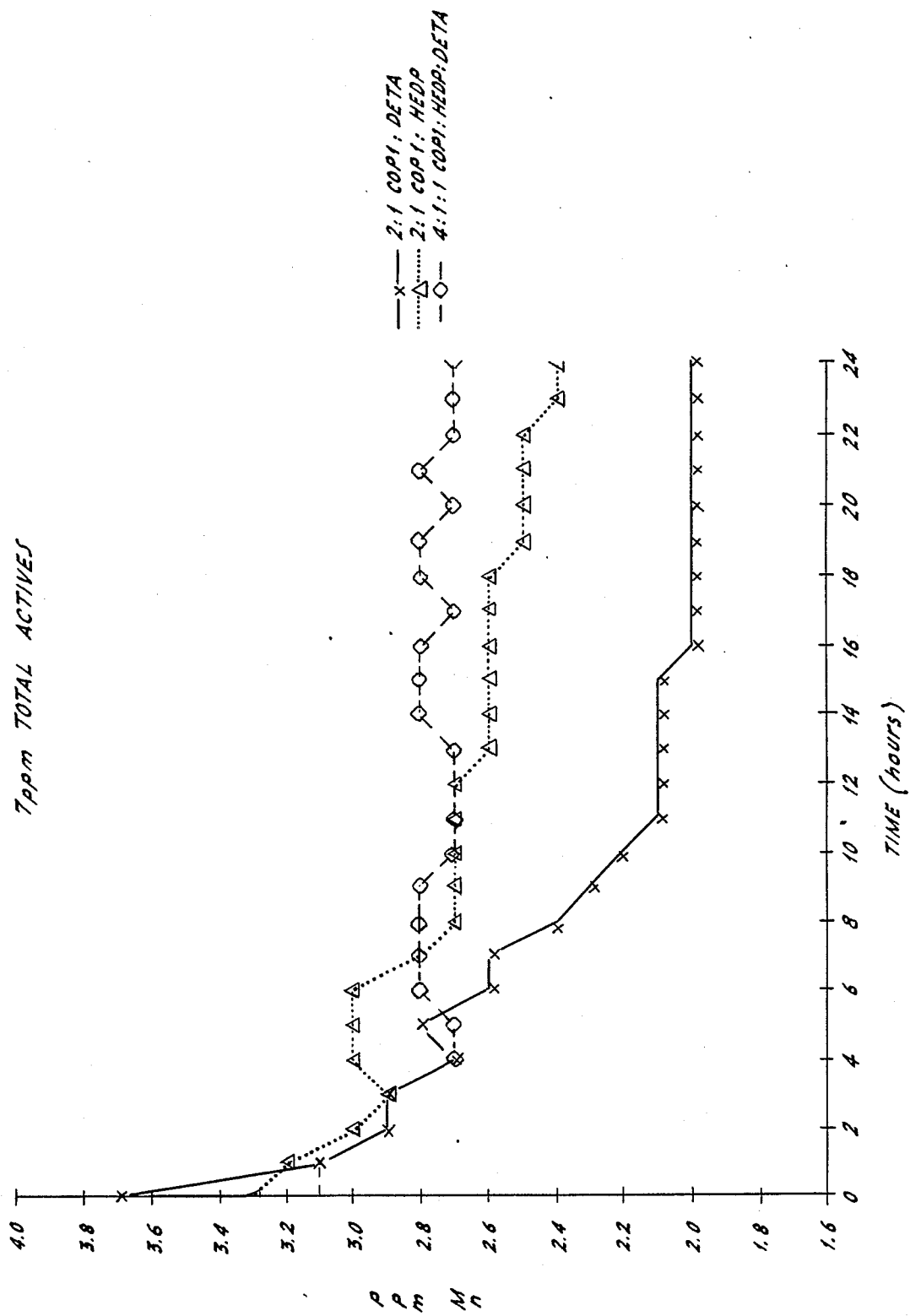
FIG. 3 shows that in 2:1 blends of COP1:organic phosphonate, HEDP is more efficacious than DETA. A blend contain 2:1 COP1:organic phosphonate where the organic phosphonate is 50% HEDP and 50% DETA exhibits efficacy between that of 2:1 COP1:HEDP and 2:1 COP1:DETA. This indicates that the preferred organic phosphonate with COP1 is HEDP.
Figure 4:
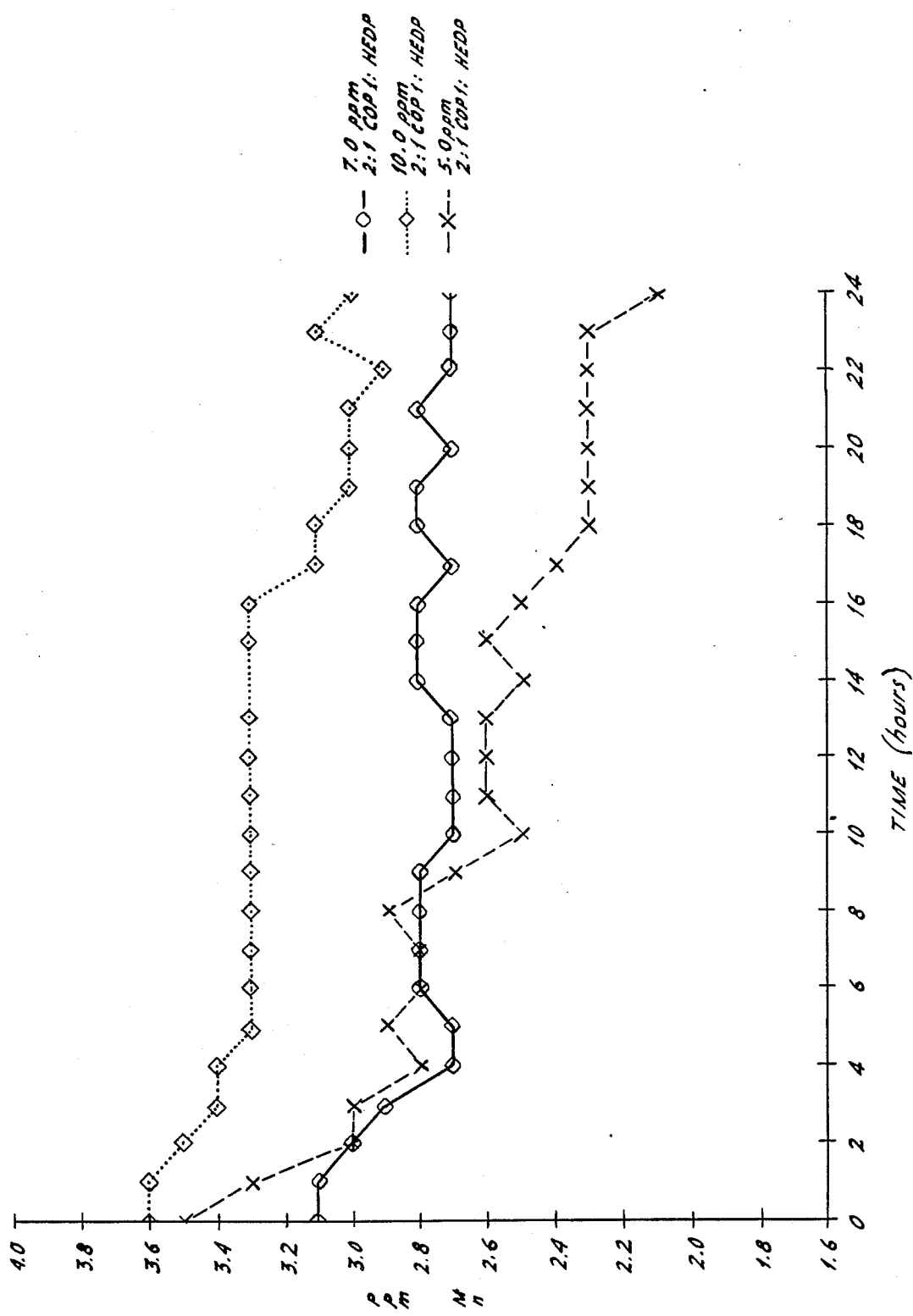
FIG. 4 shows the dose-response effect of blends of 2:1 COP1:HEDP. 10 ppm total actives is more efficacious than 7 ppm which is more efficacious than 5 ppm total actives.

The preferred blend is 2:1 to 3:1 polymer:organic phosphonate. The preferred phosphonate is HEDP and the preferred polymer is COP2.

Discussion

The examples demonstrate that the copolymers of the present invention are effective in inhibiting the formation of manganese deposits normally encountered in industrial water systems; such as, cooling systems.

The preferred rate of application of the present invention to cooling water systems and the ratio of components depends upon the manganese concentration of the system water. The treatment is preferrably applied in waters having between 0.1 and 50 ppm manganese. Within this range, the weight ratio of the manganese to phosphonate is varied from about 10:1 to about 1:10, the weight ratio of polymer to phosphonate is varied to from about 3:1 to 1:1.

The above dosages represent the most desirable ranges since most systems will be treatable therewith. Higher dosages are permissable when the situation demands, but of course are more costly. The effectiveness of the inventive treatments are dependent upon the aqueous system having a pH of 5.5 and above and preferrably 6.5 to 9.5.

While this invention has been described with respect to particular embodiments thereof, it is apparent that numerous other forms and modifications of this invention will be obvious to those skilled in the art. The claims in this invention generally should be construed to cover all such obvious forms and modifications which are within the true spirit and scope of the present invention.

What is claimed is:

1. A method of inhibiting deposition of manganese in open, recirculating aqueous systems containing at least about 0.1 ppm manganese comprising adding an effective amount for the purpose to said aqueous system:
   a. a water soluble acrylic acid/allyl hydroxy propyl sulfonate ether copolymer or water salts thereof, said copolymer having the formula:

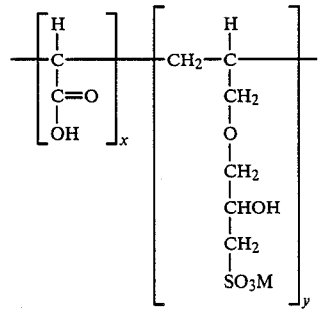

wherein, M is a water soluble cation; wherein the molar ratio x:y is from about 3:1 to about 6:1 and wherein the number average molecular weight of said copolymer is from about 5,000 to 10,000; and
   b. an organic phosphonate at a ratio of copolymer to phosphonate of about 1:1 to about 3:1.

2. The method of claim 1 wherein said ratio of copolymer to phosphonate is from about 2:1 to about 3:1.

3. The method of claim 1 wherein said phosphonate is selected from the group consisting of hydroxy ethylidene diphosphonic acid, diethylenetriamine, diethylene triamine penta-(methylene phosphonic acid) and blends thereof.

* * * * *